(No Model.) 2 Sheets—Sheet 1.

J. B. WHITAKER.
FERTILIZER DISTRIBUTER AND PLANTER ATTACHMENT FOR CULTIVATORS.

No. 603,802. Patented May 10, 1898.

Witnesses
F. M. Johnson
W. B. Hudson

Inventor
John B. Whitaker
By his Attorneys
C. A. Snow & Co.

(No Model.) 2 Sheets—Sheet 2.
J. B. WHITAKER.
FERTILIZER DISTRIBUTER AND PLANTER ATTACHMENT FOR CULTIVATORS.
No. 603,802. Patented May 10, 1898.
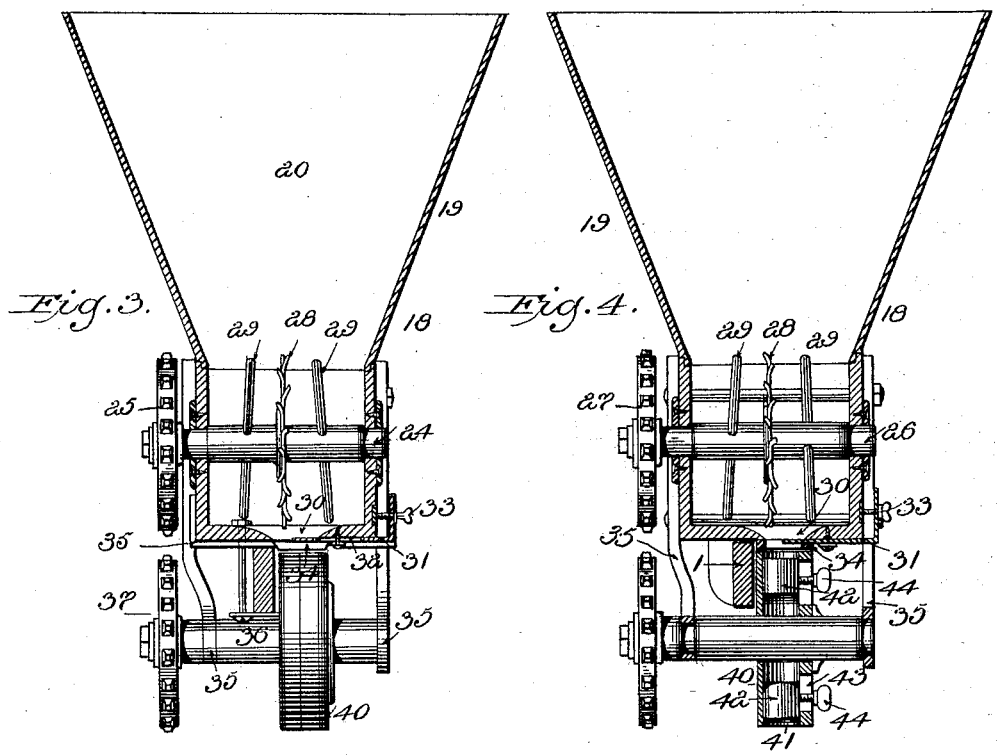
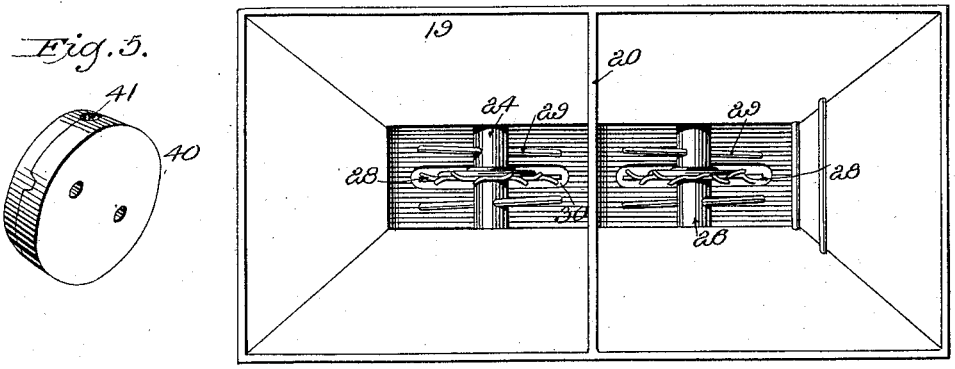
Witnesses:
Arthur Ashley
H. B. Hudson
Inventor
John B. Whitaker,
By his Attorneys,
C. A. Snow & Co.

UNITED STATES PATENT OFFICE.

JOHN B. WHITAKER, OF TENNILLE, GEORGIA, ASSIGNOR OF ONE-HALF TO BRYANT P. WYNN, OF SAME PLACE.

FERTILIZER-DISTRIBUTER AND PLANTER ATTACHMENT FOR CULTIVATORS.

SPECIFICATION forming part of Letters Patent No. 603,802, dated May 10, 1898.

Application filed December 23, 1896. Serial No. 616,745. (No model.)

*To all whom it may concern:*

Be it known that I, JOHN B. WHITAKER, a citizen of the United States, residing at Tennille, in the county of Washington and State of Georgia, have invented a new and useful Fertilizer - Distributer and Planter Attachment for Cultivators, of which the following is a specification.

The invention relates to a combined fertilizer-distributer and planter attachment for cultivators, the objects in view being to produce a cheap and simple attachment capable of being applied to any of the ordinary forms or styles of cultivators now in use and to cooperate therewith, so as to simultaneously drop corn, cotton, or other seed and fertilizer into the furrow formed by the cultivator and subsequently covered by said cultivator; furthermore, to provide for an adjustment of the parts so as to entirely cut off the flow of seed or fertilizer, whereby it may be employed either as a planter or as a fertilizer-distributer, and, furthermore, to be capable of adjustment, so as to regulate the quantity of seed planted.

With these and various other objects in view the invention consists in certain features of construction hereinafter specified, and particularly pointed out in the claim.

Figure 1:
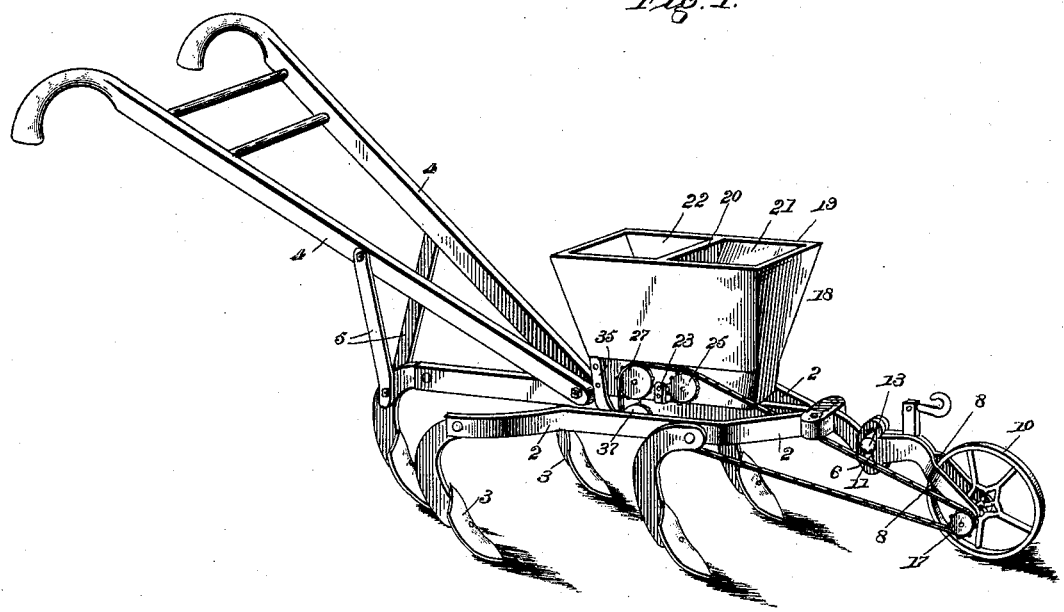
Figure 2:
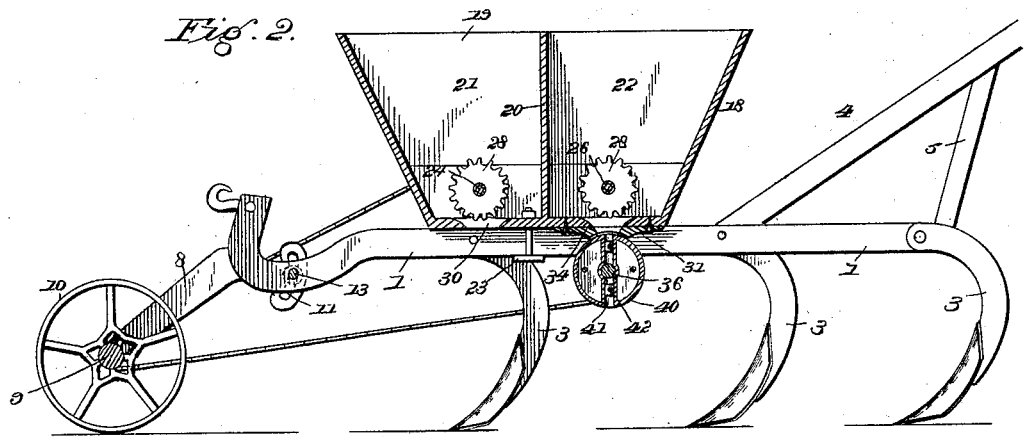
Figure 7:
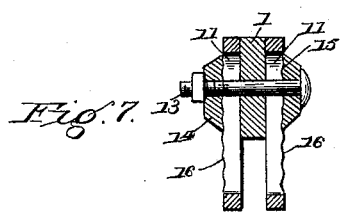

Referring to the drawings, Figure 1 is a perspective view of a cultivator, the same being provided with an attachment embodying my invention. Fig. 2 is a vertical longitudinal sectional view of the same. Fig. 3 is a transverse sectional view through the front portion of the hopper. Fig. 4 is a similar view through the rear portion. Fig. 5 is a detail in perspective of the rotatable seed-disk. Fig. 6 is a top plan view of the hopper. Fig. 7 is a detail sectional view of the clamping device for the standards.

Like numerals of reference indicate like parts in all the figures of the drawings.

In the present instance I have shown the attachment applied to one of the ordinary forms or styles of cultivators; but, as before stated, the same may be applied to any ordinary cultivator as well, and I therefore do not limit the invention in this respect. In the present instance, however, 1 designates the central main beam of the cultivator which I have selected for the purpose of illustrating my invention, to the front end of which there are loosely connected the opposite side beams 2, the said side beams being adjustable with relation to the beam 1, if so desired. The rear ends of the side beams 2 terminate in shovels 3, and in fact the rear end of the central beam may be thus provided when the cultivator is used merely as such. Handle-bars 4 rise from the central beam 1 and are secured in position or braced by means of inclined divergent braces 5. The central beam 1 extends beyond the side beams 2 and has pivotally bolted, as at 6, thereto opposite depending standards 8, whose lower ends terminate in bearings and receive a transverse axle or shaft 9, upon which is mounted for rotation therewith a ground-wheel 10. The standards 8 are of inverted-L shape and their horizontal portions are provided with slots 11, through which at any point an adjusting-bolt 13 may be passed, said bolt extending also through the central beam. A washer 14 is interposed between the head of the bolt and the nut, and the two standards are provided upon their inner faces with transverse ribs 15, which engage with any one of a series of transverse grooves 16, formed in the outer face of said horizontal portions of the standards. It will be obvious that by a loosening of the nut the standards may be swung to the front or rear, so that the wheel will be adjusted vertically, and after such adjustment the said nut may be retightened and the washers locked in position upon the standards, the latter being thus held against movement. It will also be obvious that this particular construction of wheel and support need not be employed and that any ordinary wheel may be substituted therefor. The only requisite, however, is that a sprocket-wheel 17 should be carried by the axle or the wheel for operating the parts hereinafter described.

Seated upon the central cultivator-beam of the series in advance of the handles 4 is the hopper 18, the same being surrounded by the flared and preferably sheet-metal wall 19. The interior of the hopper is subdivided by a vertical partition 20 into front and rear compartments 21 and 22, the former being designed for containing a fertilizer agent and the latter the corn, cotton, or other seed to be sown. The hopper is secured to the central beam by means of a clip or fastening 23 of ordinary construction.

In the walls of the hopper, in the compartment 21, a transverse shaft 24 is journaled, one end of which extends beyond the wall and is provided with a sprocket-wheel 25. The rear compartment is likewise provided with a transverse shaft 26, one end of which extends beyond the wall of the hopper and is provided with a sprocket-wheel 27 in line with the sprocket-wheel 25 of the front shaft. Each of the shafts within its compartment is provided with a serrated disk or feed-wheel 28 and at opposite sides of the latter with right-angularly-disposed stirring arms or pins 29. The serrations around the peripheral edge of the feed-wheels provide teeth, which are bent alternately in opposite directions, as clearly indicated in Figs. 3, 4, and 6 of the drawings, thereby insuring a positive feed and agitation of the seed at the sides of the feed-wheels. The arms or pins 29 incline from each other, so that their end portions operate in different relative planes, thereby providing for a more thorough stirring and agitating of the seed in the hopper, as will be readily understood. Openings 30 are formed in the bottoms of the compartments, through which the contents of the compartments may be discharged.

Upon the under side of the bottom of the hopper, below each compartment and at one side of each of the slots or openings 30, ways are formed and transversely disposed, and in each pair of ways there is mounted a sliding plate or cut-off 31, having slots 32 formed therein, through which headed screws are upwardly passed into the bottom of the hopper. The outer ends of the plates or cut-offs 31 are upwardly bent and perforated, and through said perforations pass adjusting-screws 33, whose inner ends bear against wear-plates located in the outer surfaces of the hopper-wall. It will be obvious that by loosening the screws 33 the said screws may be operated so as to adjust the plates in or out and thus either wholly shut off the flow of seed or partially shut off the same, whereby, as will be obvious, said flow will be regulated in accordance with the desire of the operator.

The rear plate 31 has located thereunder a curved cast-metal seat or bearing 34, and the same is provided with a longitudinal slot, which registers with the slot or opening 30 in the rear hopper. A pair of curved hangers 35 are bolted to the opposite sides of the rear end of the hopper, extend forwardly under and below the seat, and support a transverse shaft 36, one end of which is extended beyond its bearing and is provided with a sprocket-wheel 37, similar to those of the transverse feed-shafts of the compartments. A sprocket-chain passes over the entire series of sprocket-wheels—that is, those located upon the axle of the ground-wheel, the shaft 36, and upon the feed-shafts of the compartments of the hopper—so that motion is conveyed from the axle of the ground-wheel to the entire series of shafts.

Upon the shaft 36 there is located a seed-disk 40, the same being formed by the assemblage of two cast-metal disk-sections securely bolted together. This disk is provided with radial cavities 41, in each of which is mounted a follower-block 42. One side of the disk is provided with radial slots 43, that communicate with the cavities, and set-screws 44 are passed through the slots and into the followers, so that, as will be obvious, a loosening of the set-screws will permit of an adjustment of the blocks within the cavities, and thus the latter be increased or decreased in depth and adapted to contain a greater or less number of seed. These cavities in connection with the follower-block constitute what might be properly termed "seed-cups," and they are brought consecutively into register with the slot in the curved bearing-plate located upon the under side of the hopper and which is hollowed out for the reception of the disk in which the seed-cups are formed.

In operation, the seed-cups having been regulated, as well as the size of the discharge-opening in the compartments, the machine is started, motion being conveyed to all the various parts in the manner heretofore set forth.

The machine is shown as adapted for planting seed and simultaneously dropping fertilizer into the furrow, which, as will be understood, is formed by the front shovel of the cultivator. After the seed and fertilizer have been dropped the shovels following at the sides serve to cover the same, thus forming a ridge or hill. When the seed-disk is omitted, cotton and like seed will pass out directly through the opening 30, being assisted by the feed-wheel. The fertilizer arrangement remains the same whether corn or cotton-seed is being planted. Of course the planting arrangement may be thrown out of operative position and an attachment employed simply to fertilize and cultivate, all this being accomplished in a manner that will be apparent.

From the foregoing description, in connection with the accompanying drawings, it will be seen that I have provided a very simple attachment which may be readily applied to any ordinary cultivator and which is so constructed as to accurately and in predetermined quantities plant different kinds of seed and, if desired, simultaneously with said planting to distribute fertilizer in the furrow, thus accomplishing the entire operation at one time and with the use of but one machine and operator.

I do not limit the invention to the precise details of construction herein shown and described, but hold that I may vary the same to any degree and extent within the knowledge of the skilled mechanic.

Having described my invention, what I claim is—

In a planter, the combination of a hopper subdivided by a partition into front and rear compartments, and having openings in its bottom leading from the said compartments, shafts journaled in the sides of the hopper and located in the lower portion of the respective compartments, a cast-metal seat secured to the lower side of the hopper-bottom and having a slot registering with the discharge-opening of the rear compartment, and having its lower side curved upwardly between its front and rear edges, a shaft bearing a seed-disk and journaled in bearings with the seed-disk fitting snugly within the lower curved side of the seat, serrated feed-wheels secured to the shafts located in the hopper-compartments, stirring-arms applied to the said shafts upon opposite sides of the feed-wheels and inclining from each other throughout their length, a ground-wheel mounted in adjustable standards, and a sprocket-chain passing around sprocket-wheels applied to one end of the series of shafts bearing, respectively, the seed-disk, feed-wheels and ground-wheel, substantially as set forth.

In testimony that I claim the foregoing as my own I have hereto affixed my signature in the presence of two witnesses.

JOHN B. WHITAKER.

Witnesses:
J. C. HARMAN, Jr.,
HORACE LORD.